US008297239B2

(12) United States Patent
Kwok

(10) Patent No.: US 8,297,239 B2
(45) Date of Patent: Oct. 30, 2012

(54) GYROSCOPIC ROTARY ENGINE

(76) Inventor: Yau Cheung Kwok, Shatin (HK)

( * ) Notice: Subject to any disclaimer, the term of this patent is extended or adjusted under 35 U.S.C. 154(b) by 681 days.

(21) Appl. No.: 12/520,241

(22) PCT Filed: Aug. 21, 2007

(86) PCT No.: PCT/CN2007/070531
§ 371 (c)(1), (2), (4) Date: Jun. 19, 2009

(87) PCT Pub. No.: WO2008/080313
PCT Pub. Date: Jul. 10, 2008

(65) Prior Publication Data

US 2010/0018495 A1 Jan. 28, 2010

(30) Foreign Application Priority Data

Dec. 29, 2006 (CN) .......................... 2006 1 0172833

(51) Int. Cl.

| | |
|---|---|
| ***F01B 13/04*** | (2006.01) |
| ***F02B 75/26*** | (2006.01) |
| ***F02B 57/00*** | (2006.01) |
| ***F16J 1/14*** | (2006.01) |
| ***F16J 15/18*** | (2006.01) |
| ***F01C 3/00*** | (2006.01) |
| ***F04C 2/00*** | (2006.01) |
| ***F04C 3/00*** | (2006.01) |
| ***F04C 18/00*** | (2006.01) |
| ***F04B 7/04*** | (2006.01) |

(52) U.S. Cl. ......... 123/43 B; 123/43 A; 91/499; 92/179; 92/256; 418/68; 417/494

(58) Field of Classification Search ................ 123/43 B, 123/43 A; 91/499; 92/12.2, 57, 165 R, 179, 92/248, 256, 488, 485; 417/494, 269, 462; 418/68; *F01B 3/00, 3/04; F02B 57/00, 75/26; F16J 15/18*
See application file for complete search history.

(56) References Cited

U.S. PATENT DOCUMENTS

| | | | | |
|---|---|---|---|---|
| 1,553,022 | A * | 9/1925 | Benson | 91/499 |
| 1,775,892 | A * | 9/1930 | De Salardi | 92/179 |
| 2,016,605 | A * | 10/1935 | Kempthorne | 418/68 |
| 2,604,046 | A * | 7/1952 | Stoyke | 92/86 |
| 2,732,808 | A * | 1/1956 | Stoyke | 91/485 |
| 2,776,649 | A * | 1/1957 | Fenske | 123/43 A |
| 2,847,938 | A * | 8/1958 | Gondek | 91/488 |

(Continued)

FOREIGN PATENT DOCUMENTS

CN 2076164 U 5/1991

(Continued)

*Primary Examiner* — Thai Ba Trieu

(74) *Attorney, Agent, or Firm* — McNeely, Hare & War LLP; Kevin J. McNeely

(57) ABSTRACT

A gyroscopic rotary engine includes a rotary disc used as a cylinder block; a cylinder head on which medium inlets and medium outlets are arranged in a spaced relation; wherein at least two arched cylinders are disposed on the rotary disc in an equally spaced-apart relation; a gyroscopic unit disposed obliquely on the rotary disc relative to an axis of the rotary disc, the gyroscopic unit comprising a rotation shaft and pistons positioned symmetrically about the rotation shaft and having the number corresponding to the number of the arched cylinders, the pistons being disposed in the respective arched cylinders and firmly secured to the rotation shaft by respective connecting rods; and the rotary disc rotatably engaged with the cylinder head.

10 Claims, 7 Drawing Sheets

U.S. PATENT DOCUMENTS

| | | | | | |
|---|---|---|---|---|---|
| 2,867,976 | A | * | 1/1959 | Huber | 417/494 |
| 2,956,845 | A | * | 10/1960 | Wahlmark | 92/256 |
| 2,986,872 | A | * | 6/1961 | Budzich | 417/324 |
| 3,020,885 | A | * | 2/1962 | Weinstock et al. | 91/51 |
| 3,090,313 | A | * | 5/1963 | Budzich | 417/494 |
| 3,266,434 | A | * | 8/1966 | McAlvay | 92/135 |
| 3,762,276 | A | * | 10/1973 | Gates | 92/57 |
| 4,138,930 | A | * | 2/1979 | Searle | 123/43 A |
| 4,246,833 | A | * | 1/1981 | Burklund | 92/248 |
| 4,515,067 | A | * | 5/1985 | Heyl | 91/506 |
| 4,540,343 | A | * | 9/1985 | Perkins | 417/218 |
| 4,615,257 | A | * | 10/1986 | Valentin | 91/499 |
| 4,903,577 | A | * | 2/1990 | Loffler | 91/488 |
| 5,249,506 | A | * | 10/1993 | Willimczik | 91/499 |
| 5,636,561 | A | * | 6/1997 | Pecorari | 91/499 |
| 5,794,514 | A | * | 8/1998 | Pecorari | 91/499 |
| 5,960,697 | A | * | 10/1999 | Hayase et al. | 92/12.2 |
| 6,152,014 | A | * | 11/2000 | Willimczik | 91/499 |
| 6,595,886 | B1 | * | 7/2003 | Forster | 91/505 |
| 6,663,354 | B2 | * | 12/2003 | Forster | 91/499 |
| 7,029,241 | B2 | * | 4/2006 | Rousset | 92/57 |
| 7,328,647 | B2 | * | 2/2008 | Achten | 91/499 |
| 7,470,116 | B2 | * | 12/2008 | Dantlgraber | 417/269 |

FOREIGN PATENT DOCUMENTS

| | | | | |
|---|---|---|---|---|
| CN | 2402803 | Y | | 10/2000 |
| DE | 2233053 | A | * | 3/1974 |
| DE | 3304117 | A1 | * | 8/1984 |
| FR | 2484041 | A | * | 12/1981 |
| GB | 6324211 | | * | 11/1949 |
| WO | WO 8600662 | A | * | 1/1986 |

* cited by examiner

GYROSCOPIC ROTARY ENGINE

FIELD OF THE INVENTION

The present invention relates to the field of internal combustion engines, in particular, to an engine for a rotary piston.

BACKGROUND OF THE INVENTION

In power equipment like various transportation vehicles, industrial and mineral machinery, etc., an engine is one of the most commonly used in these equipments. In the traditional reciprocating engine, crankshaft linked to the piston via a connecting rod transforms the linear motion into the rotation of the shaft. Because the directions of linear motion are frequently changed in the reciprocating motion, great inertial loss of components of the reciprocating engine, such as pistons, connecting rod, and the like, would occur when changing the directions. In addition, during the movement of the piston in the cylinder, the lateral pressure generated by the friction between the piston and wall of the cylinder acts on the piston continuously, resulting in power loss of the piston.

Chinese utility model patent CN2076164U discloses a wobble engine comprising a cylinder block, a cylinder liner, a cylinder head, a piston, a camshaft, an inlet and exhaust device, a spark plug, an output shaft and an actuating device, characterized in that the cylinder block has a cylindrical shape which is divided into a plurality of cylinders by the cylinder head; a spindle is positioned in the center of the cylinder block and is surrounded by the arched cylinder liner; the copying piston is positioned into the cylinder liner in which the piston pole is fixedly connected with the spindle. When the cylinders are in operation, the power attained by of the spindle in wobbling motion of the piston in the cylinders makes the output shaft always moved in the same direction through an oriented ratchet and pawl mechanism.

Compared with the conventional linear reciprocating engine, this structure has been greatly improved so that the oscillation and the noise of the whole structures as well as the wearing capacity in respect to the roundness are reduced, because the main components of this engine make the concentric wobbling motion. But because the wobbling motion is merely a partial circumferential motion, there still exists the problem of changing the directions of the piston. Thus, dynamic loss resulting from the change of the directions would be unavoidable. Furthermore, the components forming the wobbling motion render the center of gravity of the engine to be unbalanced axially. As a consequence, there still exist various drawbacks in this structure.

Chinese utility model patent CN2402803Y discloses a rotary engine having an arched cylinder-piston, which comprises a piston-cylinder mechanism, a stopping mechanism for piston, a pendulum mechanism for piston, an inlet and exhaust mechanism, a fuel oil-supplying mechanism and a cooling mechanism, characterized in that the cylinder, the piston and the piston ring take the shape of arched cylinder. The cylinder is connected with a spindle in a key manner through the cylinder arm and is rotated synchronously with the spindle. The piston is in a relative reciprocating motion in the cylinder and moves round the spindle only in the same direction through the piston arm, not in reverse. Because no crankshaft is provided in this invention, the direction of pressure exerted by the gas on the piston is perpendicular to the rotating radius of the piston all along, thereby greatly improving the useful power in order to operate in high speed, operate smoothly and reduce the wear. However, because the piston is still in a relative reciprocating motion in the cylinder, the power loss generated by change of the directions of the movement of the piston is not resolved yet.

In view of the drawbacks of the structures in the prior art, the speed of conventional reciprocating engine can is difficult to be further increased. Also, the engine has the problems of poor balance, greatly reduced efficiency, and so on.

Furthermore, although a Wankel engine does not have a problem relating to crankshaft and has advantage of inertia, it also has the following deficiencies presently: high fuel consumption, serious air-pollution due to the discharged waste gas, serious wear of metal, etc, thus it is not popularized and needs to be further improved.

SUMMARY OF THE INVENTION

In view of the drawbacks in the prior art, an object of the present invention is to provide a rotary engine with lower kinetic energy loss and greatly increased rotational speed.

In order to achieve the above object, the present invention provides a gyroscopic rotary engine, which comprises a rotary disc used as a cylinder block; a cylinder head on which medium inlets and medium outlets are arranged in a spaced relation; wherein at least two arched cylinders are disposed on the rotary disc in an equally spaced-apart relation, such that the arched cylinders are respectively positioned to correspond to positions where the medium inlets and the medium outlets are; a gyroscopic unit is disposed obliquely on the rotary disc relative to an axis of the rotary disc, the gyroscopic unit comprising a rotation shaft and pistons positioned symmetrically about the rotation shaft and having the number corresponding to the number of the arched cylinders, the pistons being disposed in the respective arched cylinders and firmly secured to the rotation shaft by respective connecting rods; and the rotary disc is rotatably engaged with the cylinder head.

Preferably, the medium is fuel oil; at least one air inlet is arranged on the cylinder head between the medium inlets and the medium outlets and positioned to correspond to one of the arched cylinders; the medium outlets include a primary medium outlet and a secondary medium outlet; each of the pistons has an operational surface that is airtightly engaged with walls of the arched cylinders; and the rotary disc is airtightly engaged with the cylinder head other than with the medium inlets, the medium outlets and the at least one air inlet.

Preferably, the medium is steam; a partition area is arranged between the medium inlets and the medium outlets, and the medium outlets include a primary medium outlet and a secondary medium outlet.

Preferably, a turbine mechanism 75 is arranged at the primary medium outlet, and a pressure relief mechanism 80 is arranged at the secondary medium outlet.

Preferably, the medium is pressure oil; the rotation shaft of the gyroscopic unit is coaxially fixed onto a rocker shaft which is able to swivel upon a pivot with respect to the axis of the rotary disc, the pivot being an intersection point of an axis of the rotation shaft and the axis of the rotary disc.

Preferably, the rocker shaft is fixedly attached to the cylinder head.

Preferably, each of the pistons has an operational surface which is shaped to be adapted for the arched cylinders.

Preferably, each of the pistons has a spherical operational surface.

Preferably, the connecting rods are adjustably coupled with the rotation shaft.

Preferably, the rotation shaft is provided with a rotary transmission output device.

Preferably, the rotary transmission output device is selected from the group consisting of a gear, a gear rack, a flat key or spline structure, and a universal joint.

The gyroscopic rotary engine of the invention has overcome the drawback of frequent change of directions in term of structure in the operating process of the conventional reciprocating engine, and has greatly reduced kinetic energy loss of the engine and increased the speed and efficiency of the engine, because a gyroscopic unit is obliquely disposed on the rotary disc to form an engine which a useful volume of the cylinder is in a cyclic change, and to have the cylinders having changeable useful volume and the rotary disc rotated about the axis of the rotation shaft.

Because the pistons and the cylinders of the gyroscopic rotary engine of the invention are rotated about the axis, no lateral pressure applies on the walls of the cylinders and no wear exits between the pistons and walls of the cylinders in operation. Therefore, the metal materials used for the pistons and cylinders can be widely selected, so as to reduce the cost of production and decrease the failure rate of the engine.

The gyroscopic unit of the engine of the invention has an excellent balance, which meets the requirement of inertial operation. Thus, this invention has a simple structure, lower loss and lower maintenance fee.

A further detailed description will be made as to the conception, structure and expected technical effects of the present invention with reference to the accompanying drawings to make the objects, features, and advantages of the present invention fully understandable.

DETAILED DESCRIPTION

Figure 1:
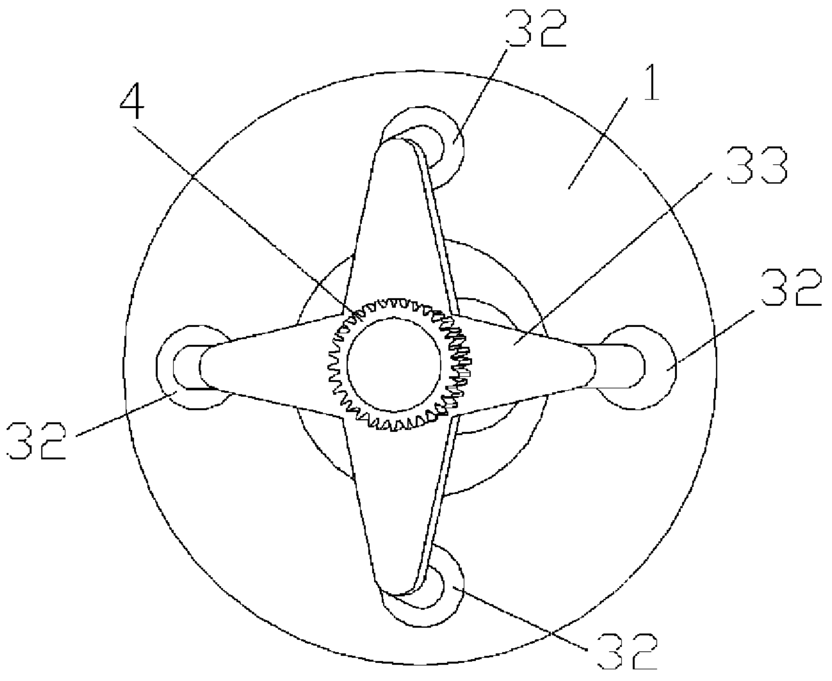
FIG. 1 is a top view of an embodiment of the invention.
Figure 2:
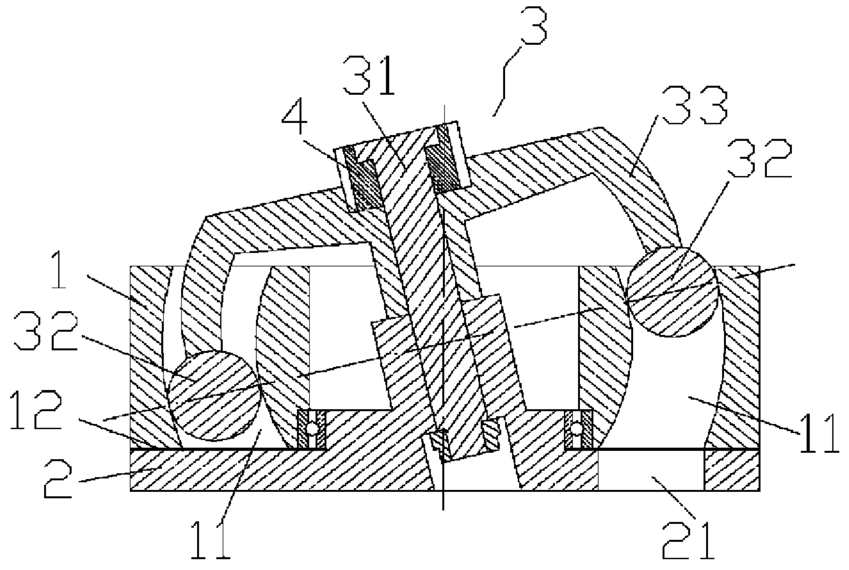
FIG. 2 is a sectional view of the embodiment of FIG. 1.
Figure 3:
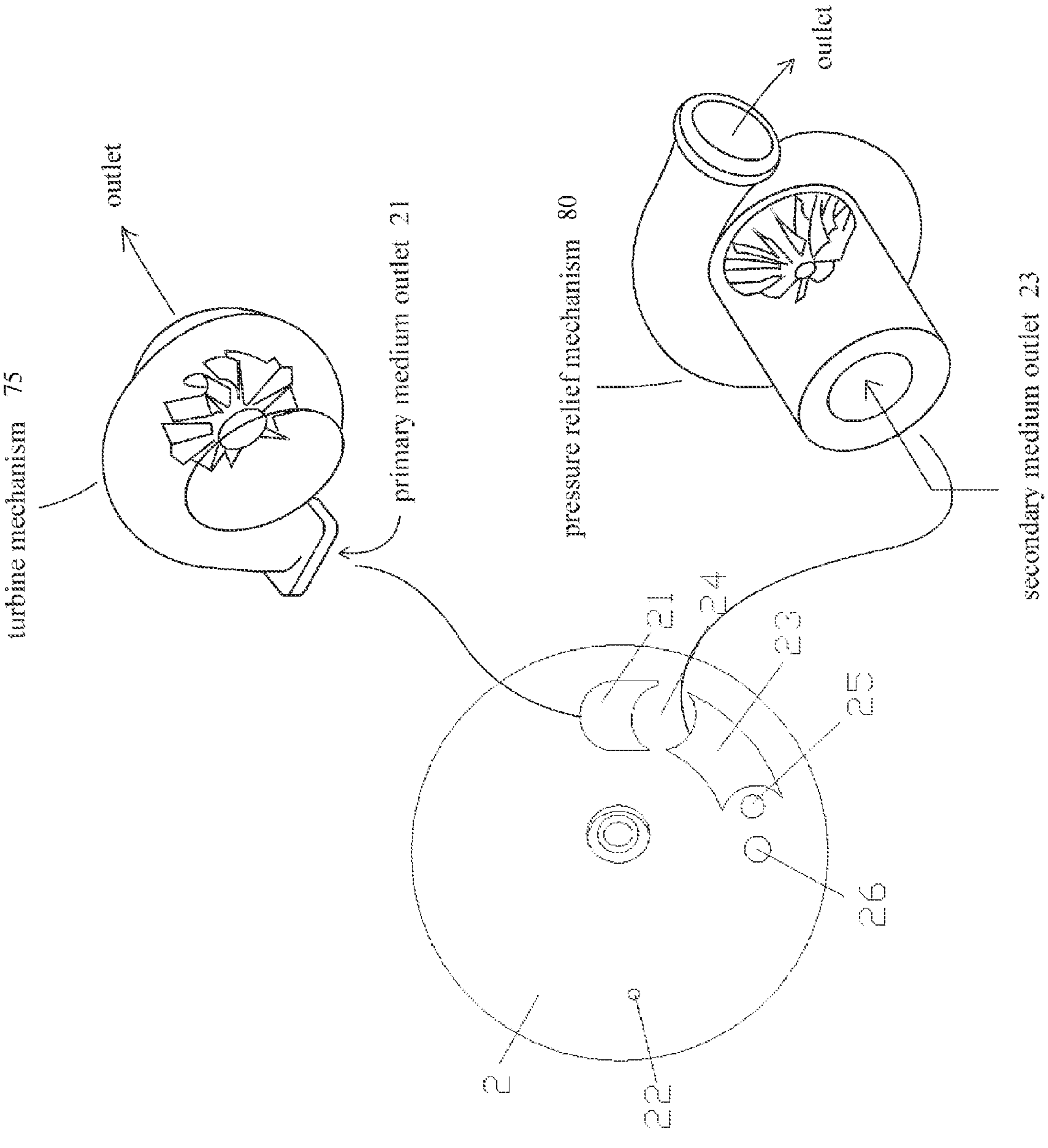
FIG. 3 is a bottom view of the embodiment of FIG. 1.

Referring to FIGS. 1, 2 and 3, an embodiment of the invention is a two-stroke diesel engine, which mainly comprises a rotary disc 1 used as a cylinder block, a cylinder head 2 and a gyroscopic unit 3.

In this embodiment, the rotary disc 1 is a hollow cylinder having better dynamic balance, on an axis of the rotary disc 1 four arched cylinders 11 are disposed in an equally spaced manner.

The cylinder head 2 is a fixed component. In this embodiment, the medium of the engine is fuel oil. In order to make air flow smoothly, medium outlets consist of a primary medium outlet 21 and a secondary medium outlet 23, and both are spacially arranged. The medium inlets 22 are used to jet the fuel oil, the primary medium 21 and secondary medium outlet 23 are used to discharge the waste gas generated by combusting the fuel oil. A partition area 24 is defined between the primary medium outlet 21 and the secondary medium outlet 23. The primary medium outlet 21 and the medium inlet 22 are respectively positioned to correspond to the positions of two of the four arched cylinders 11, so as to reasonably form a cycle for inletting and exhausting and an appropriate opportunity for jetting the fuel oil into the engine during operation. The above structures relate to the prior art, so their technical parameters are not detailed herein and can be chosen according to the technical parameters of general engines in the prior art.

One air inlet 26 is arranged between the secondary medium outlet 23 and the medium inlet 22, which is adjacent to the secondary medium outlet 23. A jetting air inlet 25 is arranged between the secondary medium outlet 23 and the air inlet 26. The positions of above inlets and outlets are designed based on movement of the air flow in the cylinders during operation of the engine.

The rotary disc 1 is rotatably engaged with the cylinder head 2. In this embodiment, general bearings are used. The engaging surface 12 of the rotary disc 1 with the cylinder head 2 is airtightly fitted, other than the positions of the primary medium outlets 21, the medium inlets 22, the secondary medium outlets 23, the jetting air inlets 25 and the air inlets 26.

The special feature of the invention lies in that the gyroscopic unit 3 is disposed obliquely on an axis of the rotary disc. In this embodiment, the gyroscopic unit 3 comprises a rotation shaft 31, and four pistons 32 positioned symmetrically about the rotation shaft 31. The four pistons 32 are disposed in the four respective arched cylinders 11 and firmly secured to the rotation shaft 31 by respective connecting rods 33. The arched cylinders 11 are shaped and sized to be adapted for the pistons 32, in order to ensure that the pistons 32 can be mounted in the arched cylinders 11 appropriately. In this embodiment, each of the pistons 32 has a spherical operational surface that is airtightly engaged with walls of arched cylinders 11. Thus, in the above structures particularly designed, the symmetric gyroscopic unit 3 is formed in the rotary disc 1, which takes the rotation shaft 31 as the axis, the umbrella-form connecting rods 33 as the radius, and the pistons 32 as the periphery. It is well known that the gyroscopic structure has an excellent dynamic balance due to its axial symmetry of every part. One of the most important contribution to the prior art is to apply the gyroscopic structure having excellent dynamic balance to the engine.

Because the rotation shaft 31 of the gyroscopic unit 3 of the invention is disposed obliquely on the axis of the rotary disc 1, the four pistons 32 which are positioned symmetrically about the rotation shaft 31 are not in the same level after the four pistons 32 and the rotation shaft 31 are all installed into the arched cylinders 11. When the engine is in operation, with the rotation of the rotary disc 1, the effective volume in the arched cylinders 11 enclosed by the cylinder head 2 and the operational surface of pistons 32 is varied in such a cyclic form, i.e., from large to small gradually, and in turn, from small to large, thereby achieving a similar effect of reciprocating motion of the conventional piston during rotation of the rotary disc 1.

The selection of the oblique angle of the above rotation shaft 31 is to ensure that a desired compression ratio of air in the arched cylinders 11 is indicated. Under different oblique angles, the diameter of the rotary disc 1 is also different. Theoretically, the smaller the diameter of the rotary disc 1 is, the steeper the oblique angle of rotation shaft 31 would be.

A rotary transmission output device is provided on the rotation shaft 31 or the rotary disc 1, so as to output the rotary torque of the rotation shaft 31 or the rotary disc 1 obtained from the arched cylinders 11. The rotary transmission output device is selected from the group consisting of a gear, a gear rack or a flat key or spline structure generally used in the relevant art. In this embodiment, a gear 4 is arranged on the rotation shaft 31, by which the power of the rotation shaft 31 is effectively output to the operating devices outside. The rotation shaft 31 is firmly secured to the cylinder head 2 by a fastening member like nuts. Obviously, the way for securing the rotation shaft 31 is not limited to the one disclosed herein, the rotation shaft 31 and cylinder head 2 may be rotatably engaged in a manner that it is often adopted by the skilled person in the art.

Next, a work flow of the two-stroke diesel engine of the embodiment of the invention is described with reference to FIGS. 4 and 5.

Figure 4:
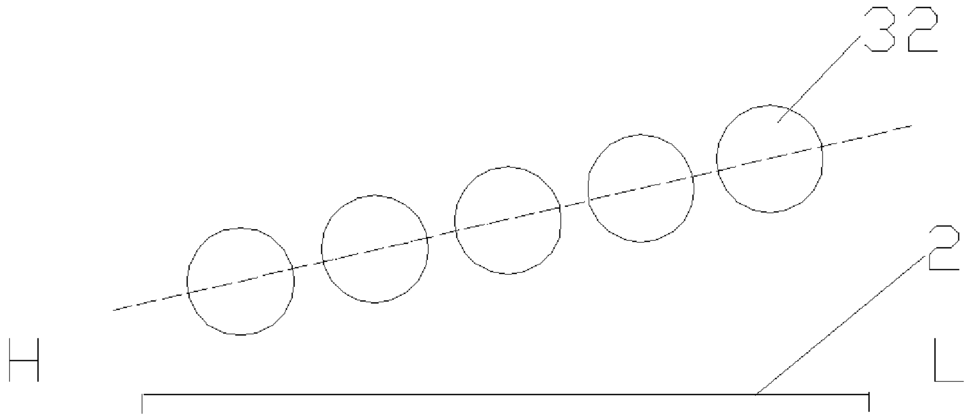
FIG. 4 is a schematic view of the pistons trajectory of the embodiment of FIG. 1.

FIG. 4 illustrates a trajectory of the pistons 32 in the arched cylinder 11 when rotating with the rotary disc 1. As the rotation shaft 31 is obliquely disposed, when rotating with the rotary disc 1, the distance between the four pistons 32 in the same level and the cylinder head 2 is circulated from small to large, and in turn, from large to small. Because of the cyclic change of the distance, effective volumes of the arched cylinders 11 are also changed from small to large, and in turn, from large to small, thereby obtaining a similar effect of the reciprocating motion in the conventional piston. In FIG. 4, H represents a state that the air in the arched cylinders 11 is under higher compression, and L represents a state that the air in the arched cylinders 11 is under lower compression. The change of the effective volume of the arched cylinders 11 is shown in FIG. 4 during rotation of the gyroscopic unit 3.

Figure 5:
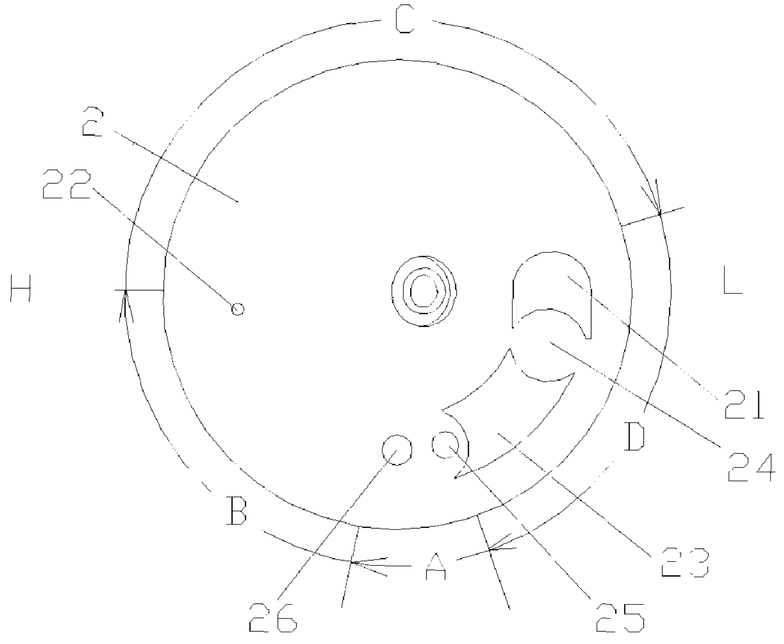
FIG. 5 is a schematic view of four operational states of the embodiment of FIG. 1.

FIG. 5 illustrates four states of the two-stroke diesel engine in operation in the embodiment. A in FIG. 5 represents a first stroke-intake. Generally, the air needs to be pressurized and then is supplied from the air inlets 26 into the arched cylinders 11. This is because a part of the compression stroke is occupied by the intake stroke. As a result, the air needs to be pressurized appropriately.

B in FIG. 5 represents a second stroke—compression. When the first stroke is performed, the air in the cylinder 11 is automatically compressed by the remaining stroke.

C in FIG. 5 represents a third stroke—explosion (power). After the compression stroke is ended, the fuel oil is instantly jetted into the arched cylinders 11 via medium inlets 22 and is combusted, and then exploded to generate huge pressure, thereby pushing the pistons 32 to make the gyroscopic unit 3 moved round the rotation shaft 31, and driving the rotary disc 1 to rotate.

D in FIG. 5 represents a fourth stroke—discharge (including gas discharging and gas exchange). When the pistons 32 reach the primary medium outlets 21, the waste gas is instantly discharged from the arched cylinders 11, and reaches the secondary medium outlets 23 via the partition area 24; at the same time, the fresh air is instantly jetted into the arched cylinders 11 to exhaust the remaining waste gas in the arched cylinders 11 via secondary medium outlet 23 (i.e. gas exchange). Then, the first intake stroke is restarted.

The above four strokes constitute a full set of strokes of the engine. Once such a set of strokes is performed, another one begins again. It continues in this way, without stoppage. In FIG. 5, H represents that the air in the arched cylinders 11 is under higher compression, while L represents that the air in the arched cylinders 11 is under lower compression.

Because the pistons 32 are coaxially rotated with the arched cylinders 11 simultaneously, but not in the same level, the angles and the distances between the pistons 32 and the annular cylinders 11 are continuously and repeatedly varied, so as to achieve the effect of reciprocating motion. The cyclic change of volumes of the cylinders in the engine of the invention is made by the repetition of the distance change between the pistons 32 and the cylinder head 2, which differs from the change of volume of the conventional cylinder caused by the change of the movement directions of the piston. The full set of stroke including intake, compression, explosion (power) and exhaust is performed by the inertial rotation of the rotary disc 1 in the same direction. Thus, the present invention has overcome the technical defect of frequent changes of directions of the piston in the conventional reciprocating engine in structure, reduced the dynamic energy loss of the engine in a maximal degree, and increased the efficiency of the engine. It is a bottleneck to increase the speed of the engine when the conventional engine has reached to a speed of 8,000-10,000 rpm, and the failure rate increases sharply. Because of the technical features described above, the engine of the invention has solved the key problem which hinders the increase of speed, thereby breaking through the aforesaid bottleneck with little change of failure rate.

Furthermore, because pistons 32 are rotated with the rotary disc 1 about the rotation shaft 31 and no relative movement between the pistons 32 and the arched cylinders 11 would occur during operation of the engine, thus there is no lateral pressure imposed on the walls of the arched cylinders 11. So the requirement for wearability of the metal material used for the pistons 32 and arched cylinders 11 is greatly decreased compared with the conventional engine, so that a variety of materials can be used for both. As a result, the engine has lowered cost. In addition, because the pistons 32 and the arched cylinders 11 have simple structure and there is no relative movement therebetween, the failure rate of the engaging portions between the pistons 32 and the arched cylinders 11 is greatly decreased.

In light of the above reasons, and the excellent balance provided by the gyroscopic unit which meets the requirement of inertial operation, the wearing capacity of the parts and the maintenance fee of the invention are comparatively low.

Figure 6:
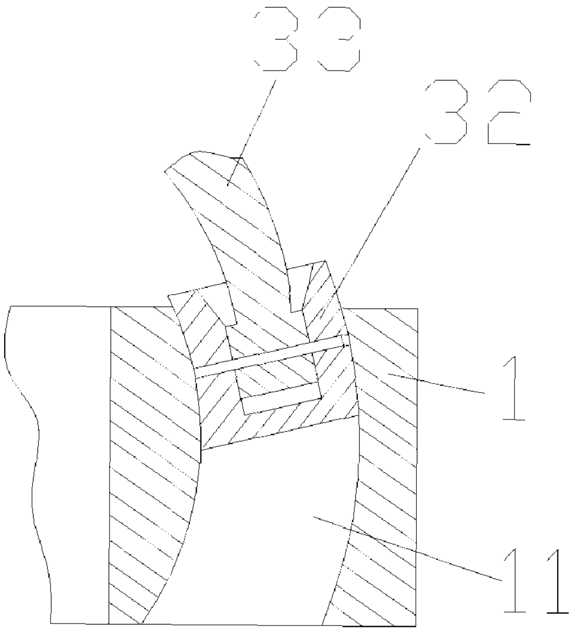
FIG. 6 is a partial sectional view of the piston of another embodiment of the invention.

As shown in FIG. 6, a partial sectional view of the piston of another embodiment is illustrated. In this embodiment, each of the pistons 32 has an operational surface which is shaped to be adapted for the arched cylinders 11, so as to satisfy the requirement of airtight engagement between the operational surfaces of the pistons 32 and the walls of the arched cylinders 11.

Obviously, the pistons 32 may have other shapes which are not limited to the above embodiments, as long as the requirement of airtight engagement between the operational surfaces of the pistons and the arched cylinders is satisfied. More preferably, each of the pistons has a spherical operational surface, so that during the circular motion of the pistons, the best effects of the proper movement can be achieved upon satisfying the requirement of airtight engagement.

Furthermore, in other embodiments of the invention, the connecting rods 33 are selected and adjustably coupled with the rotation shaft 31 to adjust the pistons 32 in the respective arched cylinders 11 by adjusting the angle between the connecting rods 33 and the rotation shaft 31, depending on the requirement of engine in operation. The aforesaid adjustable connection is conventional in the art, which is not described herein in detail.

Obviously, the number of the arched cylinders 11 may have various choices, which for example, can be four in the above embodiment, or two, or six or eight, and so on. The arched cylinders 11 are disposed on the rotary disc 1, therefore if the number of the cylinders and pistons are increased in the same engine, the whole volume and weight of the engine are little changed, which has little limitation to the use of the engine. This is also an important advantage of the present invention.

Figure 7:
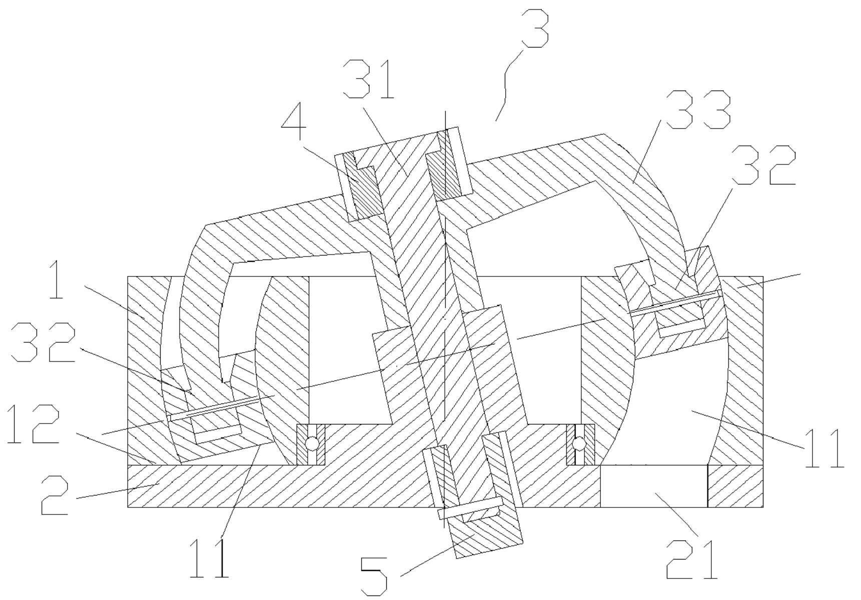
FIG. 7 is a schematic view of power output of the embodiment of FIG. 6.

As shown in FIG. 7, another improvement of the embodiment is that the rotary transmission output device of the rotation shaft 31 is not limited to the gear 4 being mounted on its front end. It can also be connected with a connecting unit at the rear end of the rotation shaft 31 be means of pins like universal joint 5, or directly connected with the power transmit component. Hence, no matter connection with the front or rear end or both the two ends of the rotation shaft 31, they are effective ways to output the power of the rotation shaft 31.

Referring to FIG. 3 again, this embodiment also discloses another improvement of the invention, that is, a turbine mechanism 75 is arranged at the primary medium outlet 21, which would not decrease the power; and a pressure relief mechanism 80 is arranged at the secondary medium outlet 23. The discharged air drives directly the pressure relief mechanism. When the piston departs from the primary medium outlet 21 and reaches the secondary medium outlet 23 passing through the partition area 24, the remaining waste gas immediately enters into the pressure relief mechanism and exits out. When the engine is in a lower speed, an external electrical motor is needed to maintain the efficiency of the pressure relief mechanism. Because the exhaust valves of the invention are fully opened, 80% of the waste gas can be discharged through the primary medium outlet 21 at the first time, and the power of the engine can be maintained sufficiently. Moreover, the air can be jetted through the top of the pistons 32, then a better effect of discharging waste gas can be attained, and the environmental pollution is effectively decreased. Thus, the engine of the invention meets the requirement of environmental protection.

Another embodiment of the invention is a steam engine employing the gyroscopic engine, which has the substantially same structure with the first embodiment. The main difference is that the fuel oil is substituted by steam as a medium to transmit pressure. According to the property of the steam distinguishing from fuel oil, an adjustment for the medium outlets and the total volume of the arched cylinders should be made by adding more combinations of pistons and arched cylinders. Preferably, more than 10 combinations of pistons and annular cylinders are arranged.

Figure 8:
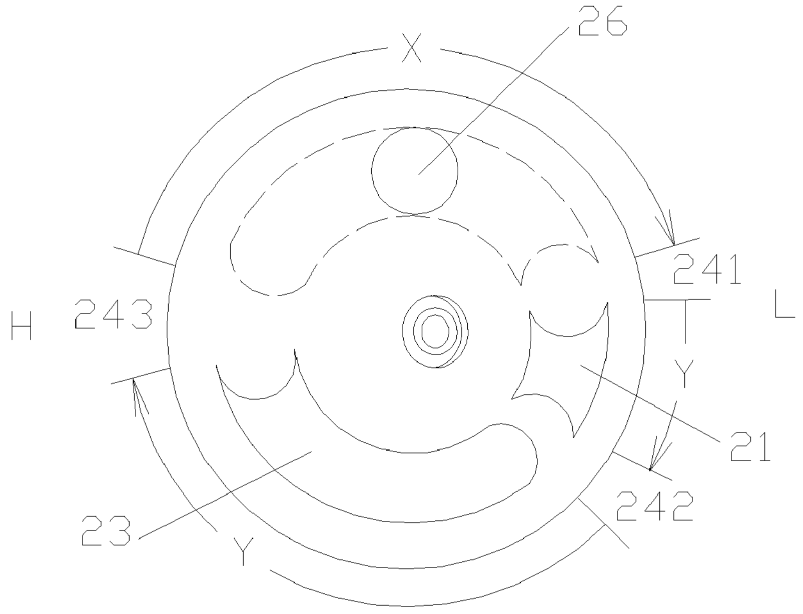
FIG. 8 is a bottom view of a steam engine of further embodiment of the invention.

FIG. 8 is a bottom view of the steam engine of the embodiment, in which, X represents a compression area, Y represents an air discharging area, H represents a minimum value of the effective volume in the arched cylinders, L represents a maximum value of the effective volume in the arched cylinders, the areas H and L contain the same pressure steam, respectively. The high pressure steam enters from air inlets 26 into the compression area X which is hollow, then all the steam in the cylinders are compressed simultaneously and pulled toward the pistons 32 (not shown in figure), thus making the rotary disc 1 driven by the pistons 32 to move round the axis of the rotation shaft 31, then passing beyond the partition area 241 and reaching the gas discharging area Y. The steam instantly exits out from the primary medium outlet 21, and the remaining steam passes beyond the partition area 242 and exits out via the secondary medium outlet 23. After the steam arrives at the partition area 243, a new stroke begins again.

The primary medium outlet 21 and the secondary medium outlet 23 in above embodiment are shaped and positioned to fully utilize the energy of the waste gas, and the energy is therefore remained to be used by the turbine being arranged at the medium outlet. Because the primary medium outlet 21 is fully opened, the cylinders are in the high compression state and the exited steam enters into the turbine, which makes a proper gas flow and may hardly influence the dynamic energy of the engine. The steam exited out via the primary medium outlet 21 has 70% of dynamic energy. Obviously, according to the circumstances of the engine, a single medium outlet may be arranged, which can also realize the invention. Thus, the structure of the invention is not limited to the arrangement of primary medium outlet and secondary medium outlet.

Because the steam is difference from the fuel oil per se, the requirement of airtight engagement of the arched cylinders 11 of the engine of this embodiment is not as strict as that of the fuel oil engine. In other words, little leakage of the engaging surface of the arched cylinders and the rotary disc is permitted. Furthermore, such the leakage on the engaging surface of the rotary disc and the arched cylinders forms an airpad, thereby maximally reducing the rotatory friction between the rotary disc and the arched cylinders, and further reducing the dynamic energy loss of the engine and increasing the efficiency of the engine.

Similarly, little leakage of the airtight engaging surface of the arched cylinders and the pistons may also be permitted, which can also reduce the friction without influencing the efficiency of the engine.

The steam engine of this embodiment is simply operated without any other active mechanism to cooperate. In addition, the lower airtight requirement may assist to increase the rotary speed of the engine and the engine therefore has the advantage of piston structure. The high pressure steam in the cylinders exited out through gyroscopic unit can reenter into the steam engine, which are perfect use of the energy and a maximal reduction of the energy consumption.

Figure 9:
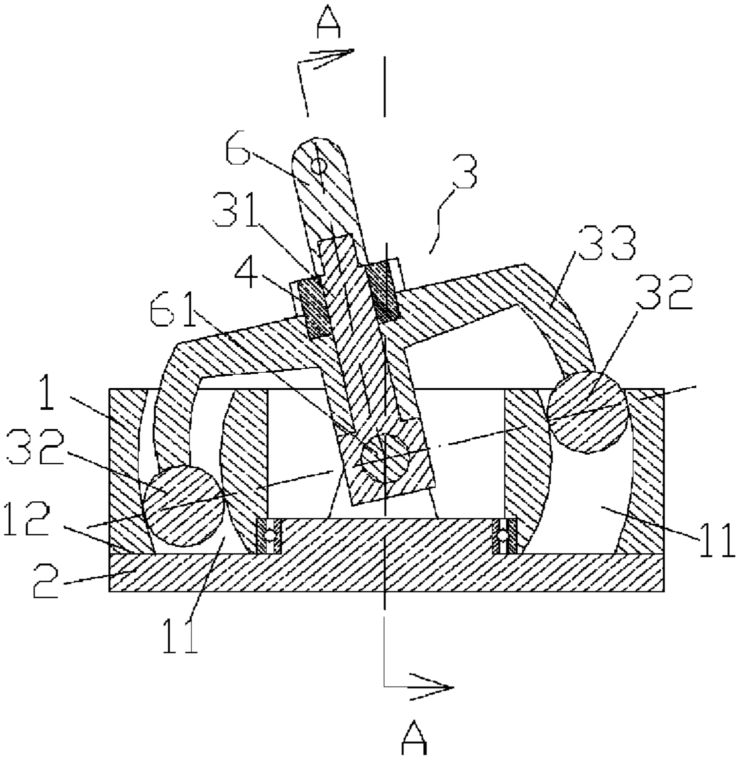
FIG. 9 is a sectional view of stepless speed variation hydraulic motor of another further embodiment of the invention.
Figure 10:
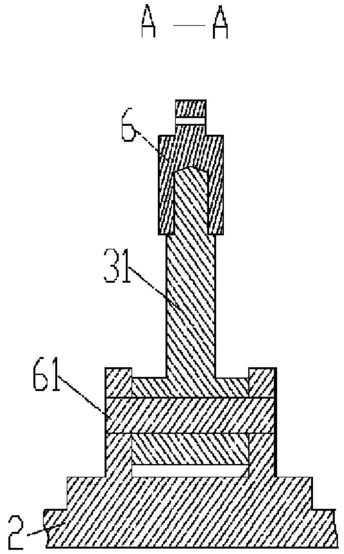
FIG. 10 is a partial sectional view taken on line A-A of FIG. 9.
Figure 11:
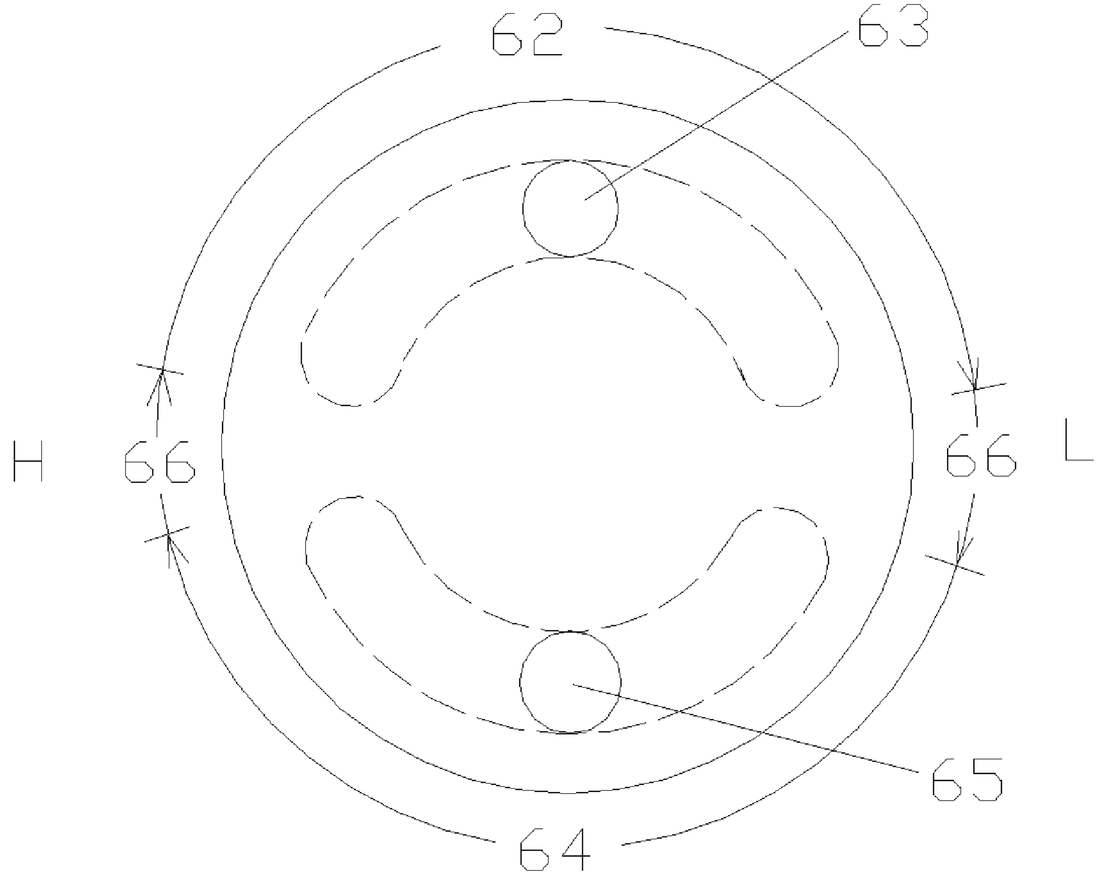
FIG. 11 is a bottom view of the embodiment of FIG. 9.

Referring to FIG. 9, a stepless speed variation hydraulic motor is shown in another embodiment of the invention. This embodiment has a similar structure with the first embodiment, except that the rotation shaft 31 of the gyroscopic unit 3 is coaxially fixed onto the rocker shaft 6. As shown in FIGS. 9 and 10, the rocker shaft 6 is fixedly arranged on the cylinder head 2, and is able to swivel and adjust upon a pivot with respect to the axis of rotary disc 1, the pivot being an intersection point 61 of the axis of the rotation shaft 31 and the axis of rotary disc 1. Thus, with the adjustment of the angle of the rocker shaft 6, the gyroscopic unit 3 fixed on the rocker shaft 6 can also be adjusted, and thus the angle between the rotation shaft 31 and the axis of the rotary disc 1 can be adjusted accordingly. FIG. 10 mainly illustrates the position relations among the cylinder head 2, the rotation shaft 31, the rocker shaft 6 and the intersection point 61, but the clear position relations among the cylinder block 1, the gear 4, the pistons 32 and the connecting rods 33 which are shown in FIG. 9 are not illustrated here. As shown in FIG. 11, in this embodiment, the medium inlet is an oil inlet 63 being arranged on the cylinder head 2 which runs through the hydraulic area 62. The medium outlet is an oil outlet 65 running through the oil discharging area 64. The hydraulic area 62 and the oil discharging area 64 are hollow, and two partition areas 66 are respectively arranged between the head portion and rail portion of the hydraulic area 62 and the oil discharging area 64.

The operation of this embodiment is performed as below: the pressure oil is quantitatively output via a hydraulic pump (not shown in the figures), and enters into the hydraulic area 62, then, the pressure oil pushes toward the pistons 32 to make the rotary disc 1 driven by the pistons 32 to rotate around the axis of the rotation shaft 31. Consequently, the pressure oil passes beyond the partition area 66 and reaches the oil discharging area 64 for discharging oil. After reaching the partition area 66, a new stroke cycle would be restarted. It is of importance that the oil discharging area 65 is necessary to be full of oil always, in order to prevent air from entering into the arched cylinders 11. The nature of this embodiment is that the pressure oil in lieu of the fuel oil or the steam is used as a medium for transmitting pressure in the gyroscopic unit 3. By the continuous hydraulic pressure, the gyroscopic unit 3 is driven, so as to drive the rotary disc 1 to be rotated. In the above operations, if the position of rocker shaft 6 is changed, the angle between the rotation shaft 31 and the axis of the rotary disc 1 is changed accordingly. As a result, the position of piston 32 in the same arched cylinder 11 are changed, so that the effective volume of the arched cylinders 11 is varied, which makes the arched cylinders 11 to operate in different compression ratios. When the above angle is increased, the compression ratio of the pistons 32 is also increased, which slows down the speed of the rotary disc 1 driven by the gyroscopic unit 3 and increases the moment; vice versa, when the above angle is decreased, the gyroscopic unit 3 accelerates the speed of the rotary disc 1, resulting in the decreased moment. By adjusting the angle of the rocker shaft, the object of stepless speed variation of the gyroscopic unit can be achieved. When the gyroscopic unit 3 and the rotary disc 1 are in the same level, each of pistons 32 lies in the corresponding arched cylinder 11 at the same level, which makes each of arched cylinders 11 have an identical effective volume, resulting in no compression ratio in the arched cylinders 11. Thus, the hydraulic oil cannot enter into the arched cylinders at the same time. In addition, the above angle can be also adjusted on another side of the axis of the rotary disc 1, based on the same operation principle, nut it's rotation runs reverse.

The stepless variable speed motor of the invention can perform the stepless variable drive by adjusting the angle between the rotation shaft 31 and the axis of the rotary disc 1, i.e., the effective volume in the arched cylinders 11 correspondingly positioned in the rotary disc 1 is adjusted accordingly, and by changing the compression ratio of the arched cylinders 11.

The invention has the advantages of very simple structure, easy operation and control, and little dynamic loss.

The gyroscopic engine of the invention and its variations can be used as an engine of aero amphibious transportation tools and a mechanical power device, in order to substitute the conventional reciprocating engines. In accordance with the prior art, it can be produced to be a steam or hydraulic motor, compressor and stepless speed variation hydraulic motor, etc, in combination with the improvement of inlet and exhaust valves.

In a word, the engines described in the description are merely several preferable embodiments of the invention. Any technical solutions which are obtained by those skilled in the art through logical analysis, reasoning or limited experiment in light of the conception of the invention in combination with prior art are within the protective scope as defined in the appended claims.

What is claimed is:

1. A gyroscopic rotary device comprising:

a cylinder head on which inlets for supplying intake medium and outlets for discharging exhaust medium are arranged in a spaced relation;

a rotary disc configured as a cylinder block and having at least two arched cylinders that are disposed on the rotary disc in an equally spaced-apart relation, such that the arched cylinders are respectively positioned to correspond to positions of the medium inlets and the medium outlets;

a gyroscopic unit disposed obliquely on the rotary disc relative to an axis of the rotary disc, the gyroscopic unit comprising a rotation shaft and pistons positioned symmetrically about the rotation shaft, the number of pistons corresponding to the number of the arched cylinders, the pistons being disposed in the respective arched cylinders and firmly secured to the rotation shaft by respective connecting rods;

wherein the rotary disc is rotatably engaged with the cylinder head;

the intake medium is selected from a group consisting of pressure oils, fuel oil, and steam; and the rotation shaft of the gyroscopic unit is coaxially fixed onto a rocker shaft which is able to swivel upon a pivot with respect to the axis of the rotary disc, the pivot being an intersection point of an axis of the rotation shaft and the axis of the rotary disc.

2. The gyroscopic rotary device according to claim 1, wherein the gyroscopic rotary device is working as an engine, being supplied with the fuel oil;

at least one air inlet is arranged on the cylinder head between the inlets for supplying the intake medium being the fuel oil and the outlets for discharging the exhaust medium and positioned to correspond to one of the arched cylinders;

the outlets for discharging the exhaust medium further include a primary outlet and a secondary outlet;

each of the pistons includes an operational surface that comprises an airtight engagement with walls of the arched cylinders; and the rotary disc comprises an airtight engagement with the cylinder head other than with the inlets, the medium outlets and the at least one air inlet.

3. The gyroscopic rotary device according to claim 1, wherein the gyroscopic rotary device is working as an engine being supplied with the intake medium being the steam; and a partition area is arranged between the inlets for supplying the steam and the outlets for discharging the steam, and the outlets for discharging the steam further include a primary outlet and a secondary outlet.

4. The gyroscopic rotary device according to claim 2, further comprising:

a turbine mechanism arranged at the primary outlet; and a pressure relief mechanism arranged at the secondary outlet.

5. The gyroscopic rotary device according to claim 1, wherein the rocker shaft is fixedly attached to the cylinder head.

6. The gyroscopic rotary device according to claim 1, wherein each of the pistons has an operational surface which is shaped for the arched cylinders.

7. The gyroscopic rotary device according to claim 1, wherein each of the pistons has a spherical operational surface.

8. The gyroscopic rotary device according to claim 1, wherein the connecting rods are adjustably coupled with the rotation shaft.

9. The gyroscopic rotary device according to claim 1, wherein the rotation shaft further comprises a rotary transmission output device.

10. The gyroscopic rotary device according to claim 9, wherein the rotary transmission output device is selected from a group consisting of a gear, a gear rack, a flat key or spline structure, and a universal joint.

* * * * *